United States Patent [19]
Bruene

[11] 4,302,844
[45] Nov. 24, 1981

[54] CARRIER TRANSMISSION THROUGH HARMONIC POLLUTED MEDIUM

[75] Inventor: Warren B. Bruene, Dallas, Tex.

[73] Assignee: Rockwell International Corporation, El Segundo, Calif.

[21] Appl. No.: 21,529

[22] Filed: Mar. 19, 1979

[51] Int. Cl.³ .................. H04J 1/12; H04B 15/00
[52] U.S. Cl. ........................ 375/58; 370/69; 340/310 A; 455/50
[58] Field of Search ........... 340/170, 171 R, 310 R, 340/310 A, 288; 178/66 R, 67; 325/30, 52, 38 R, 45, 47, 42, 65; 179/15 AN, 15 FD; 455/26, 44, 50, 51, 63; 375/2, 37, 58, 60, 81, 99, 120; 370/6, 69, 84

[56] References Cited

U.S. PATENT DOCUMENTS

| | | | |
|---|---|---|---|
| 2,401,618 | 6/1946 | Crosby | 375/60 |
| 2,579,882 | 12/1951 | Thompson | 455/50 |
| 3,084,223 | 4/1963 | Marcatili et al. | 179/15 AN |
| 3,084,327 | 4/1963 | Cutler | 455/44 |
| 3,368,036 | 2/1968 | Carter et al. | 375/85 |
| 4,040,046 | 8/1977 | Long et al. | 340/310 A |
| 4,101,834 | 7/1978 | Stutt et al. | 340/310 A |

Primary Examiner—Benedict V. Safourek
Attorney, Agent, or Firm—Howard R. Greenberg; H. Fredrick Hamann

[57] ABSTRACT

A carrier signal modulated with digital data is transmitted through a medium polluted with harmonic signals by asymmetrically positioning the carrier signal frequency between two adjacent harmonics and employing a baud rate for the data so that the (sin x)/x spectral density nulls of the modulated carrier signal in the frequency domain coincide with the two adjacent harmonics, thus affording efficacious discrimination against the harmonics in the receiver detector which has a matching frequency response.

12 Claims, 9 Drawing Figures

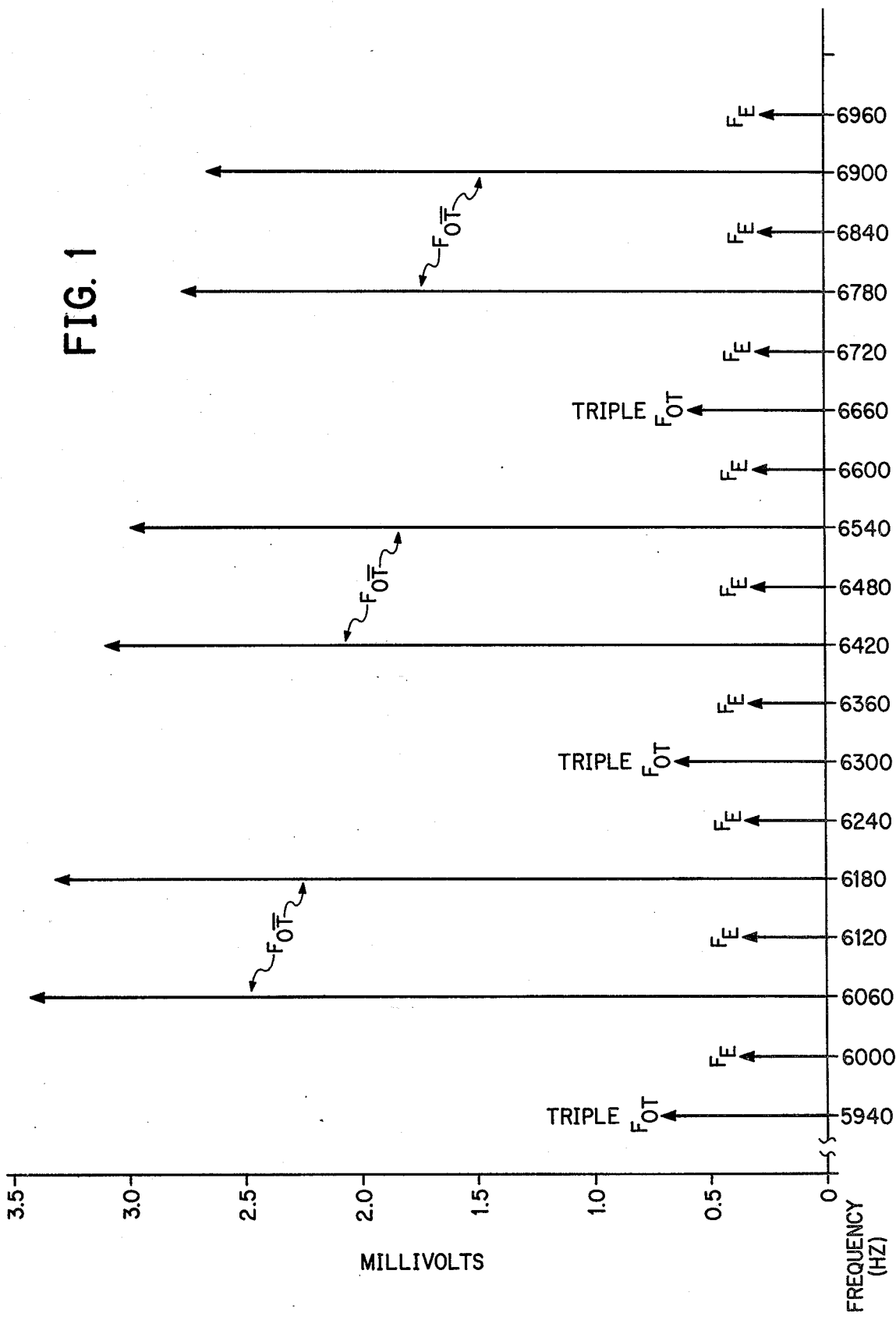

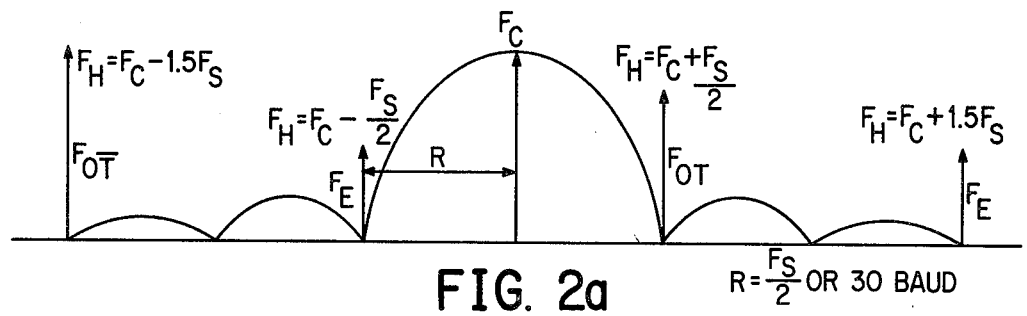
FIG. 2a  $R = \frac{F_S}{2}$ OR 30 BAUD
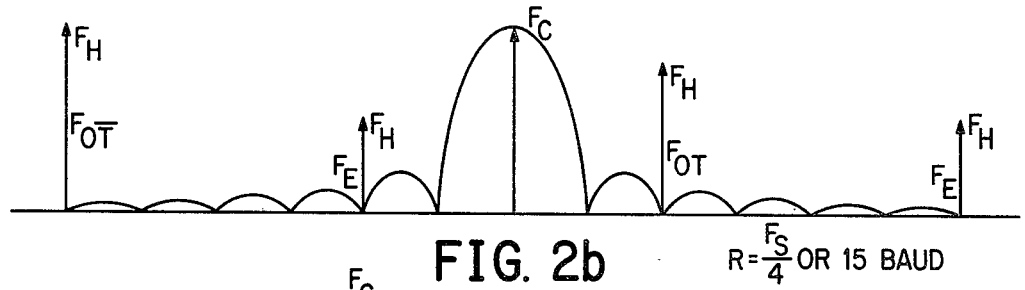
FIG. 2b  $R = \frac{F_S}{4}$ OR 15 BAUD
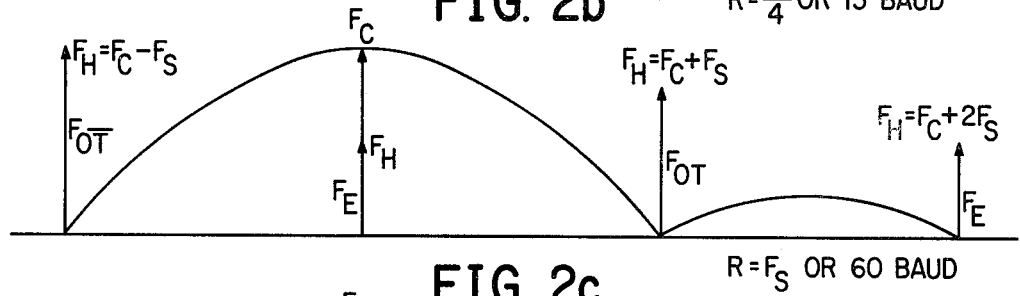
FIG. 2c  $R = F_S$ OR 60 BAUD
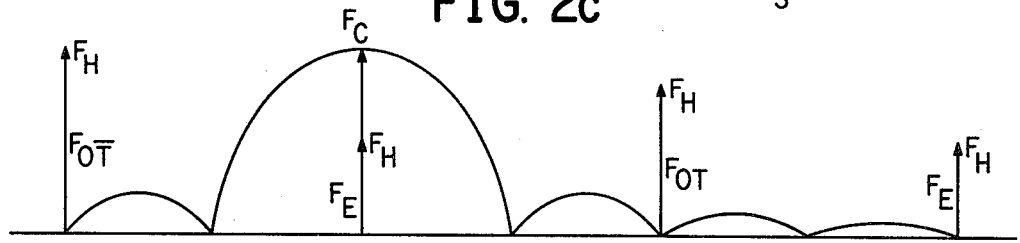
FIG. 2d  $R = \frac{F_S}{2}$ OR 30 BAUD
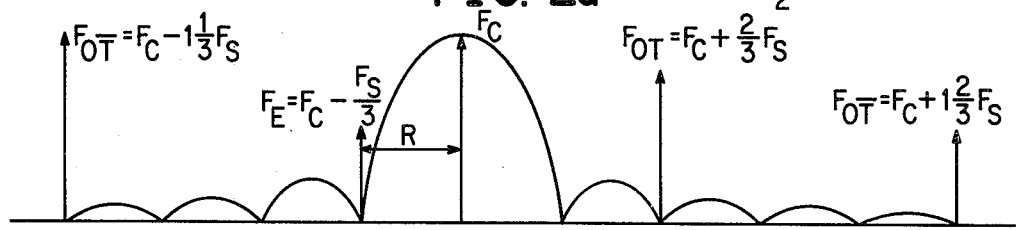
FIG. 2e  $R = \frac{F_S}{3}$ OR 20 BAUD
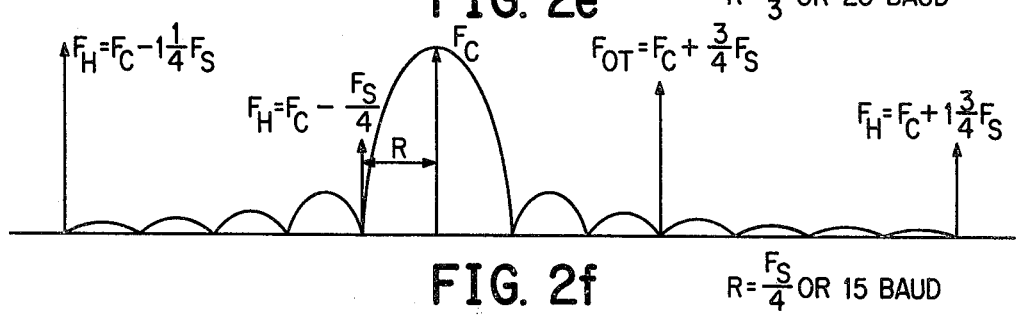
FIG. 2f  $R = \frac{F_S}{4}$ OR 15 BAUD

CARRIER TRANSMISSION THROUGH HARMONIC POLLUTED MEDIUM

BACKGROUND OF THE INVENTION

The subject invention pertains generally to electronic communications and specifically to communications systems entailing the transmission of a digital data modulated carrier signal through a medium polluted with harmonic signals.

The transmission of digital data by carrier signal through some medium may entail discriminating against harmonic signals which pollute the medium in order to properly detect and demodulate the carrier signal to retrieve the data. An example of such a system is the use of electric power systems as a communications channel for data which allows utility customer loads to be monitored for accounting purposes and controlled for load management from a central remote site. Aside from the broadband and impulse noise found on a power system which pose a hostile environment for communication signals, harmonic noise consisting of harmonics of the power system fundamental frequency (60 hertz in the United States and 50 hertz in European countries) must be obviated if a meaningful communication signal is to be transmitted and received. A very effective way for solving this problem is explicated in U.S. Pat. No. 3,368,036 entitled "Demultiplexing and Detecting System For Predicted Wave Phase-Pulsed Data Transmission System" in which is described a commercial system known as Kineplex developed by the assignee of the subject patent application for transmitting a plurality of carrier signals at different equally spaced frequencies in a frequency division multiplexed arrangement between a common transmitter and receiver while preventing any cross-talk among the various channels. This is accomplished by setting the baud period (duration of single period over which the carrier signal characteristic, e.g. phase, remains constant for defining one or more bits) equal to the reciprocal of the frequency separation between adjacent harmonics. The well known resultant (sin x)/x function, where $x = \pi T(F - F_c)$ radians, representative of the spectral density versus frequency function in the frequency domain for a pulsed carrier signal (of baud period T) at a particular carrier frequency $F_c$, has nulls at all of the other carrier signal frequencies. Thus a receiver detector which integrates the DC signal developed from the carrier signal indicative of the data for a period equal to that of the baud (and consequently having a matching frequency response) passes only the carrier signal frequency of interest while rejecting all of the others. If all of these undesired carrier signal frequencies vis-a-vis the particular carrier signal frequency of interest are analogized to the power signal harmonic frequencies found on a power system, it becomes readily apparent that the Kineplex technique for discriminating against equally spaced signal frequencies is directly applicable to the problem of transmitting a communication signal over a power system polluted with harmonic noise.

Although the evolving field of power system communications does now employ the aforedescribed Kineplex technique (e.g. see U.S. Pat. Nos. 4,109,204 and 4,012,734), it is to be noted that all of the systems proposed to date center the carrier signal either on a power frequency harmonic or between two adjacent harmonics, thereby failing to take advantage of the disparate magnitudes exhibited by power system harmonics in the discrimination process.

With the foregoing in mind, it is a primary object of the present invention to provide a new and improved means for transmitting communication signals indicative of digital data through a medium polluted with harmonic signals.

It is a further object of the present invention to provide such a new and improved means wherein the adjacent harmonics are of dissimilar magnitude.

It is still a further object of the present invention to provide such a new and improved means wherein the medium is an electric power system and the harmonics are multiples of the power system frequency.

The foregoing objects as well as others and the means by which they are achieved through the present invention may best be appreciated by referring to the Detailed Description of the Invention which follows together with the appended drawings.

BRIEF DESCRIPTION OF THE INVENTION

In accordance with the foregoing objects, the present invention enhances the transmission of a carrier signal modulated with digital data through a medium polluted with harmonic signals by asymmetrically positioning the carrier signal frequency between two of the adjacent harmonics and employing a baud rate for the data so that the (sin x)/x spectral density nulls of the modulated carrier signal in the frequency domain coincide with those harmonics corresponding to the frequency response of a matching receiver detector. This entails setting the baud rate to the harmonic fundamental frequency or some submultiple thereof. In one alternative embodiment, wherein the transmitted baud rate and the integration period for the integrate and dump process used in the detector for sampling the DC signal indicative of the data contained in the baud are different, with the integration period being less than that corresponding to the baud period so as to provide a guard time, the integration period of the detector affords the (sin x)/x nulls so as to discriminate against the harmonics. The foregoing technique is particularly beneficial in a medium such as an electric power system wherein adjacent harmonics have dissimilar magnitudes and the asymmetry of the carrier signal frequency between the harmonics permits the insertion of a greater number of spectral density nulls of the (sin x)/x function between the carrier signal and the larger harmonic (odd order triple) than the smaller harmonic (even order) to achieve enhanced discrimination thereagainst.

BRIEF DESCRIPTION OF THE DRAWINGS

FIG. 1 is a depiction of typical harmonics of the fundamental power frequency found on a 60 hertz electric power system derived from actual measurements.

FIGS. 2a-2d are (sin x)/x representations in the frequency domain based on the prior art while FIGS. 2e and 2f are like representations based on the current invention.

DETAILED DESCRIPTION OF THE INVENTION

Figure 3:
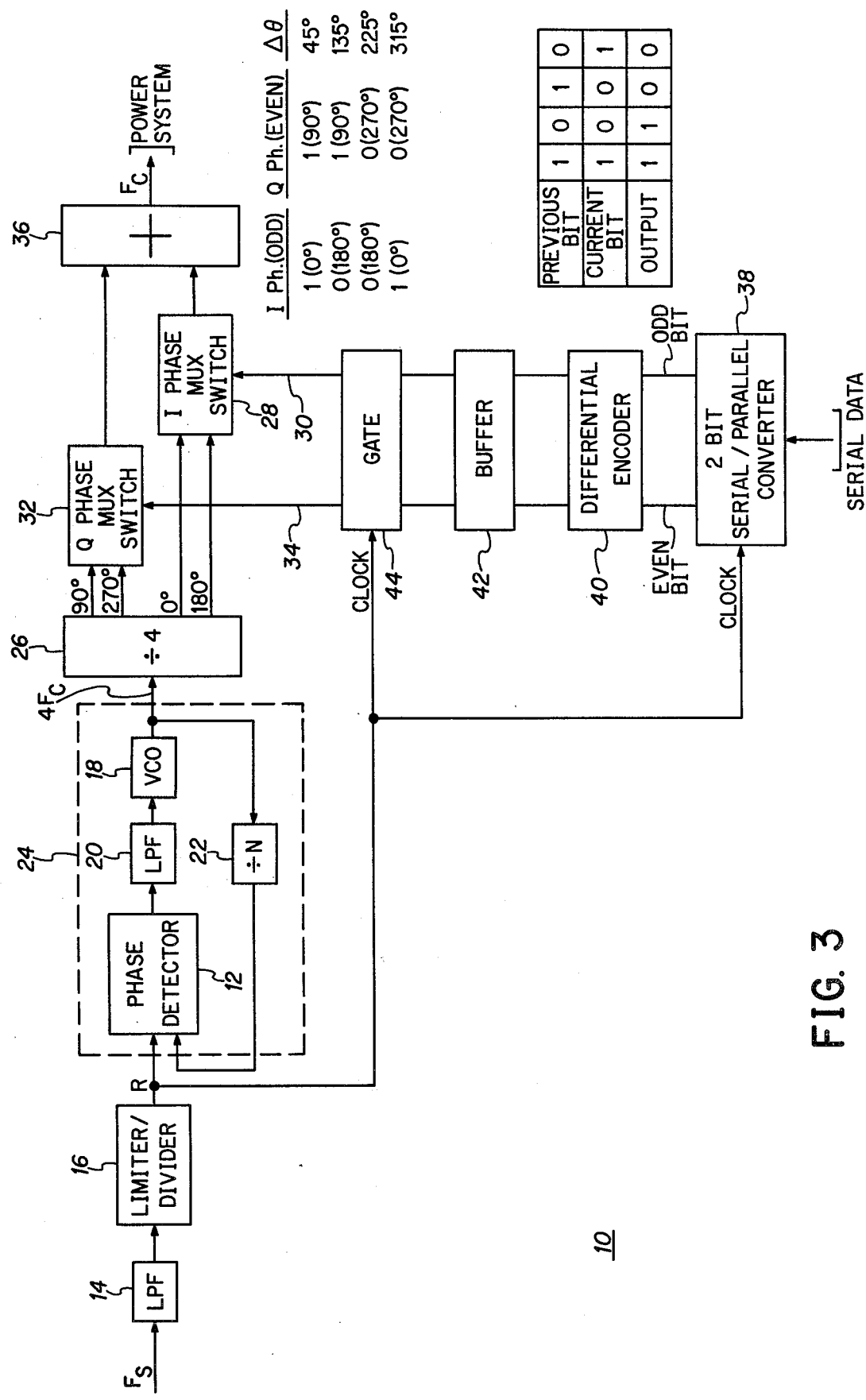
FIG. 3 is a block diagram representation of a four-phase differential phase shift keyed (DPSK) modulator for preferably effectuating the invention herein.

FIG. 1 is a pictorial representation in the frequency domain of typical power system frequency harmonics found on a 60 hertz 3φ power system distribution line, and indeed were derived from actual measurements. As alluded to under the Background of the Invention, these harmonics, having amplitudes in the millivolt range, seriously interfere with the ability to properly transmit and receive data communication signals over power lines. As further discussed, this problem of harmonic interference or crosstalk as found on frequency division multiplexed communication systems was obviated by the assignee's Kineplex technique earlier developed for those systems (with each frequency channel and all of the remaining channels being respectively analogous to the carrier frequency and the power harmonics in a power system) and now with respect to the later evolving power line communications systems by centering the carrier frequency $F_c$ between two adjacent power system harmonics and transmitting at a baud rate which is a submultiple of the fundamental frequency $F_s$ (60 hertz) so that the resultant (sin x)/x function (negative lobes inverted only for clarity of presentation) produces spectral density nulls on the harmonics in the frequency domain as shown in FIGS. 2a and 2b, exemplifying, respectively, two baud rates R of 30 and 15 baud per second. Through the use of a matched receiver detector having a like frequency response such as wherein the carrier signal is converted to a DC signal indicative of the baud valve which is then integrated for a period equal to 1/R, only the energy contained in $F_c$ is detected with the energy engendered by the adjacent harmonics $F_H$ being rejected. As further shown in FIGS. 2c and 2d, some of the prior art literature even suggests locating the carrier signal $F_c$ on a power system harmonic $F_H$ in order to achieve higher data rates (in the case of FIG. 2c R being equal to the fundamental frequency or 60 baud), notwithstanding the loss of discrimination against the coincident harmonic frequency.

Referring back to FIG. 1, it is to be noted that none of these foregoing prior art approaches take advantage of the dissimilarity in magnitude of the power system frequency harmonics. Aside from the generally declining magnitudes for the harmonics with increasing frequency, it is to be noted that there is a discernible pattern in which pairs of prominent odd order harmonics $F_{O\bar{T}}$ are immediately followed by a much less prominent odd order harmonic $F_{OT}$. As is well known, the harmonics $F_{OT}$ correspond to odd order harmonics of the power system frequency which are divisible by three (e.g. the third, ninth, fifteenth, etc. harmonics which are multiples of 180 hertz and are characterized herein as triples and thus the use of the subscript T) and which are attenuated in magnitude from the odd harmonics $F_{O\bar{T}}$ which are not divisible by three, resulting from the cancellation effects on three-phase balanced power systems generally. As is well known, the even order harmonics $F_E$ exhibit the smallest magnitudes. In centering the carrier frequency $F_c$ between two adjacent harmonics as in FIGS. 2a and 2b or on a harmonic for that matter as in FIGS. 2c and 2d, as taught by the prior art, the discrimination against the harmonics on which the first nulls fall is treated equally, notwithstanding that these harmonics have different magnitudes and could and should be treated differently.

As shown in FIG. 2e, if the carrier signal $F_c$ is asymmetrically positioned between two adjacent harmonics such as $F_E$ and $F_{OT}$, then two benefits are realized. One, since among any three consecutive harmonics, $F_{O\bar{T}}$ has the largest magnitude, placement of the carrier signal between the other two harmonics enhances harmonic discrimination because of their reduced magnitude. And two, placement of the carrier signal $F_c$ closer to $F_E$ than $F_{OT}$ places the first null of the (sin x)/x function (assuming a baud rate R of 20 baud per second) on the smaller of the two harmonics while placing the second null on the larger of the two harmonics so as to further enhance harmonic discrimination. This affords an additional 6 db of attenuation (two to one voltage improvement) over the smaller harmonic, which is desirable since the energy in a given harmonic is not truly infinitesimally narrow at a null as theoretically pictorially represented. If greater discrimination enhancement is desired and a lower data rate is acceptable then more nulls can be interjected between the carrier signal $F_c$ and the greater adjacent harmonic $F_{OT}$ merely by employing data rates which are higher submultiples of the power system frequency $F_s$. Such an example is shown in FIG. 2f wherein the fourth submultiple of the power system frequency 60 hertz, equivalent to 15 baud, is depicted so that the third null of the (sin x)/x function coincides with $F_{OT}$.

A block diagram for a four-phase DPSK modulator, designated generally as reference numeral 10, for preferably utilizing the invention herein is shown in FIG. 3, wherein the power system frequency signal $F_s$ is applied as a first input to a phase detector 12 upon passage through a low pass filter 14 to reject unwanted frequencies in excess of the power system fundamental frequency $F_s$ and limiter/divider circuit 16 to provide a square wave output signal whose frequency is equal to the baud rate R. Phase detector 12, together with a voltage controlled oscillator (VCO) 18 to which its output is applied via a low pass filter 20, and an N frequency divider circuit 22 interconnecting the output of VCO 18 with a second input to phase detector 12 comprise a phase lock loop circuit 24. The output frequency of VCO 18, $4F_c$ ($4F_c$ being determined by the value of N) thus tracks $F_s$ ($F_s$ being a multiple of R) so that as the power system frequency varies so does the carrier signal $F_c$ to maintain correspondence therewith and thus the nulls of the (sin x)/x function vis-a-vis the power system frequency harmonics $F_H$.

As delineated in the '036 patent covering the Kineplex System, previously alluded to, the carrier signal $F_c$ is advanced by 45° or some odd multiple thereof during each baud period dependent on the values of the two bits which comprise the baud. This is reflected in the table of FIG. 3 showing the change in phase angle $\Delta\theta$ as a function of both the first or odd bit (in phase channel) of each bit pair constituting a baud and the second or even bit (quadrature channel) of the pair. Thus, if both bits are high or equal to a logic level one, the carrier phase angle is advanced 45°, and so forth. The angle in parenthesis alongside the bit value of the table shows the change in its channel angle to achieve the net incremental change in carrier phase angle $\Delta\theta$. The table is effectuated by applying the output, $4F_c$, of VCO 18 to a divide by four circuit 26, having four outputs, all of which have the same frequency $F_c$ but differ in phase angle by 90° beginning with a 0° phase angle. $F_c$ is of course selected so as to coincide with the asymmetric location between the two adjacent power system harmonics $F_H$ as previously delineated. The 0° and 180° output leads are applied to an in phase mux switch 28 having a single output which is connected to the 0° input lead when the control bit on lead 30 to mux switch 28 corresponds to a logic level one and to the 180° input lead when the control bit on lead 30 corresponds to a logic level zero. In similar fashion, the 90° and 270° output leads of divide by four circuit 26 are connected to a quadrature phase mux switch 32 whose single output lead is connected to the 90° input lead when the control bit on input lead 34 thereto corresponds to a logic level one and to the 270° input lead when the control bit corresponds to a logic level zero. The outputs of mux switches 28 and 32 are vectorially added in summer 36 whose output then provides the modulated carrier signal $F_c$ for transmission to a remote location via the electric power system.

The control bits on leads 30 and 34 are derived from the serial data for conveyance by the carrier signal $F_c$ by first applying the serial data to a two bit serial/parallel converter 38 wherein each two bits of consecutive serial data is converted to the parallel outputs corresponding to the first or odd bit and the second or even bit under a suitable baud timing clock derived from the output of limiter/divider circuit 16. The two output bits of converter 38 are applied to a differential encoder 40 wherein they are compared with the previous bits to afford differential modulation wherein the carrier signal phase angle in each baud period serves as the reference signal for the next consecutive baud period. As shown by the accompanying table, no change in bit value in the current baud period from the previous baud period produces a "1" output control bit while a change produces a "0" output control bit. The control bit outputs of differential encoder 40 are then applied to their respective mux switches 28 and 32 via a buffer circuit 42 which is employed to accommodate any time disparities between the serial data rate and the carrier signal transmission baud rate and a gate 44 which is strobed from the output of limiter/divider circuit 16 which enables gate 44 at the beginning of each baud period so as to maintain baud timing synchronization.

Figure 4:
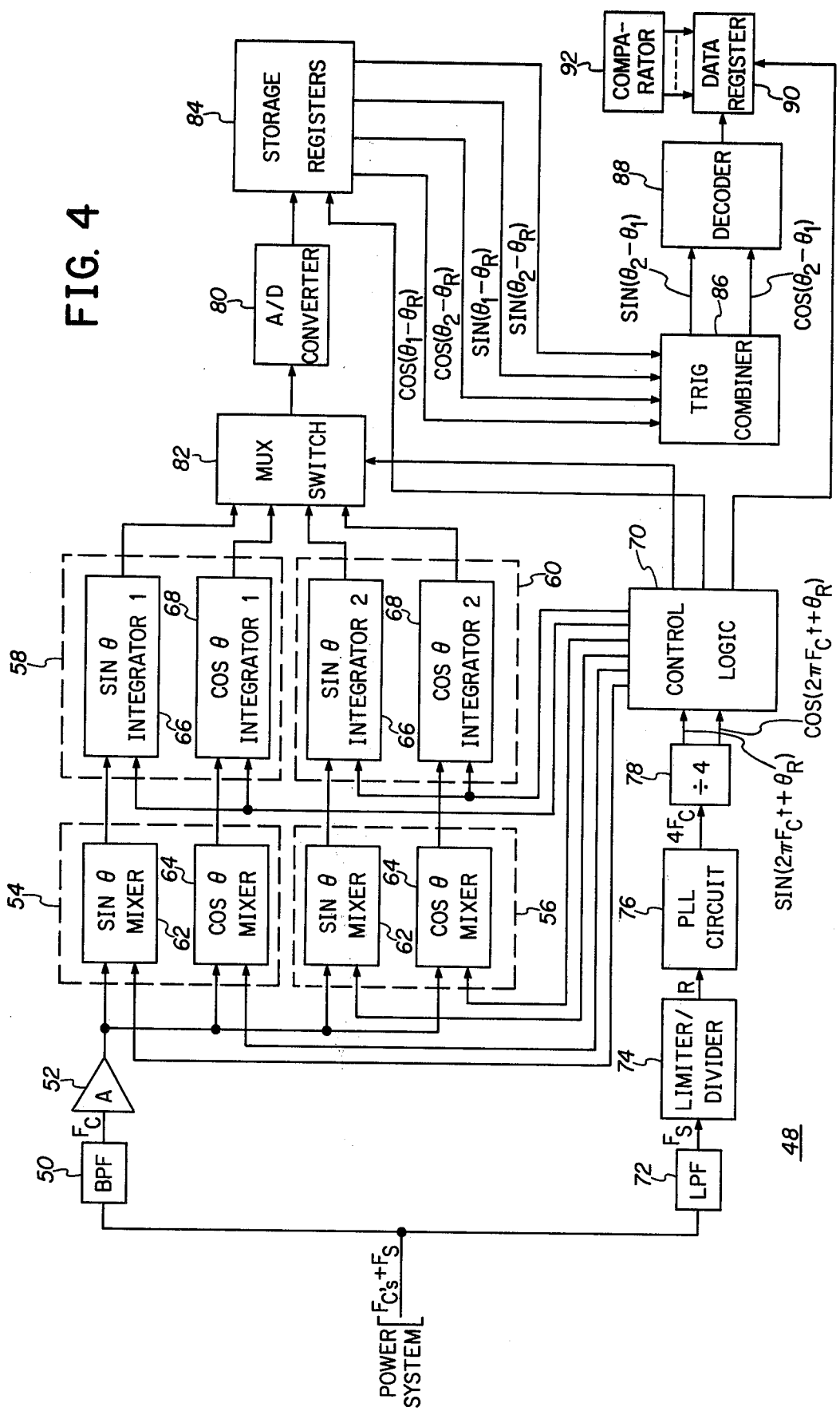
FIG. 4 is a block diagram of a four-phase differential phase shift keyed (DPSK) demodulator for receiving and detecting the digital data transmitted by the modulated carrier signal.

The block diagram for a four-phase DPSK demodulator, designated generally by the reference numeral 48, for preferably implementing the subject invention is shown in FIG. 4. Since the operation of this demodulator is described in detail in a commonly owned U.S. Pat. No. 4,225,964, issued on Sept. 30, 1980, entitled "Detection Means For Providing Multiple Baud Values Of An Individual Baud Period Of A Carrier Signal To Obviate Baud Timing Ambiguities" it will be treated only briefly herein. The carrier signal $F_c$ and power system frequency $F_s$ received from the power system are split into two paths, with the carrier signal $F_c$ being routed via the upper path through a bandpass filter 50 and amplifier 52 to a pair of mixer circuits 54 and 56, with each being associated with a pair of integrator circuits 58 and 60, respectively. Each mixer circuit 54 and 56 consists of a $\sin \theta$ mixer 62 for providing a DC signal which corresponds to the quadrature component (even bit) and a $\cos \theta$ mixer 64 for providing the in phase component (odd bit). Each of the integrator circuits 58 and 60 consists of a $\sin \theta$ integrator 66 and $\cos \theta$ integrator 68 for integrating the DC signals applied thereto from its respective mixer circuit during alternate baud periods, with one of the integrator circuits integrating during odd periods and the other during the even periods. During the non-integration periods, each integrator circuit 58 and 60 is initialized to a predetermined state preparatory to its ensuing integration period. The outputs of integrators 66 and 68 are representative of the two bit values in each baud period by virtue of their respective signs. It is to be noted that as long as the reciprocal of these integration periods are equal to or are submultiples of the power system frequency $F_s$, the nulling benefits associated with the $(\sin x)/x$ function are obtained, notwithstanding that the baud transmission rate may be longer and not itself so related to the power system frequency $F_s$. This permits guard times to be employed at the beginning and end each integration interval vis-a-vis the transmission baud interval so as to eliminate the possibility of signal energy in one baud period extending into the consecutive baud period, which could otherwise impair the detection process.

The DC outputs of mixer circuits 54 and 56 are provided through synchronous detection by mixing with the carrier signal $F_c$ a signal of like frequency, differing in phase therefrom by either some fixed phase angle $\theta_R$ (for $\cos \theta$ mixers 64) or $\theta_R + 90°$ (for $\sin \theta$ mixers 62). These signals are applied to mixer circuits 54 and 56 in the appropriate baud periods at the output of a control logic circuit 70 which is located in the lower path to which the power system frequency $F_s$ is applied upon passage through low pass filter 72. After passage through a limiter/divider circuit 74 to develop a square wave signal of frequency R, the power system related frequency signal R is applied to a phase lock loop circuit 76 whose output, which is equal to $4F_c$, is then divided by 4 via a divide by four circuit 78 to provide at its output the two quadrature related mixing signals.

The analog outputs of integrator circuits 58 and 60 are converted to digital values via an A/D converter 80 upon sequential passage through a mux switch 82 under the control of an output from control logic circuit 70. The digital signal outputs of converter 80 are then retained in storage registers 84 so that the phase information during each baud period can be compared with that for the immediately preceding period in order to eliminate the phase angle $\theta_R$ and obtain the difference between $\theta_2$ and $\theta_1$ wherein the subscript 2 designates the current baud period and the subscript 1 designates the immediately preceding baud period. The foregoing data retention is of course required only because a differential modulation scheme is preferred over an absolute reference scheme so as to establish a correctly phased reference signal for the detector. The data bit values which are defined by the sin and cos of $\Delta\theta$, $\Delta\theta$ being equal to $\theta_2 - \theta_1$, are formulated in trigonometric combiner 86 which are then applied to decoder 88 which implements the table of FIG. 3 to produce at its output the two serial bits contained in the baud period. The output of decoder 88 is entered into a data register 90, under the control of an output from control logic circuitry 70, which functions as a shift register to receive and store bits until a predetermined bit pattern such as in a preamble and address field is recognized by virtue of comparison with a comparator circuit 92. Upon recognition of a valid message, the data contained in register 90 is then shifted out to a permanent register (not shown) for appropriate processing.

It is understood that the invention herein is not limited to the foregoing four-phase DPSK modulation scheme which was presented only as an exemplary application thereof. Accordingly, the scope and spirit of the invention are to be limited only by the claims which will now be set forth hereinbelow.

What is claimed is:

1. Apparatus for transmitting digital data by carrier signal through a medium polluted with harmonic signals, whereby the harmonics may be nulled in the receiver detector, comprising:
   means for generating a carrier signal whose frequency is asymmetrically positioned between two of the adjacent harmonics, and
   means for modulating the carrier signal with digital data at a baud rate so that the spectral density nulls of the modulated carrier signal in the frequency domain coincide with said two adjacent harmonics.

2. The apparatus of claim 1 wherein one of the adjacent harmonics bounding the carrier signal frequency is greater in magnitude than the other and the frequency separation between the carrier signal frequency and the larger harmonic is greater than that between the carrier signal frequency and the smaller harmonic.

3. The apparatus of claim 2 wherein the medium is a three phase 60 hertz electric power system with the harmonics being multiples of the power system frequency and said larger bounding harmonic is an odd one which is a multiple of 180 hertz.

4. A method of transmitting digital data by carrier signal through a medium polluted with harmonic signals whereby the harmonics may be nulled in the receiver detector, comprising:
   generating a carrier signal whose frequency is asymmetrically positioned between two of the adjacent harmonics, and
   modulating the carrier signal with digital data at a baud rate so that the spectral density nulls of the modulated carrier signal in the frequency domain coincide with said two adjacent harmonics.

5. The method of claim 4 wherein one of the adjacent harmonics bounding the carrier signal frequency is greater in magnitude than the other and the frequency separation between the carrier signal frequency and the larger harmonic is greater than that between the carrier signal frequency and the smaller harmonic.

6. The method of claim 5 wherein the medium is a three phase 60 hertz electric power system with the harmonics being multiples of the power system frequency and said larger bounding harmonic is an odd one which is a multiple of 180 hertz.

7. Apparatus for communicating digital data through a medium polluted with harmonic signals by passing a modulated carrier signal therethrough having a characteristic which is varied in a predetermined manner during each baud period representative of the data, comprising:
   means for generating a carrier signal whose frequency is asymmetrically positioned between two of the adjacent harmonics;
   means for modulating the carrier signal with digital data at a predetermined baud rate;
   means for applying the modulated carrier signal to the medium at some point;
   means for receiving the modulated carrier signal from the medium at another point;
   synchronous detecter means for demodulating the carrier signal by converting the varying characteristic thereof to a DC signal, and
   means for integrating the DC signal during each baud period for a time interval that places the spectral density nulls of said synchronous detector means response in the frequency domain at said two adjacent harmonics.

8. The apparatus of claim 7 wherein one of the adjacent harmonics bounding the carrier signal frequency is greater in magnitude than the other and the frequency separation between the carrier signal frequency and the larger harmonic is greater than that between the carrier signal frequency and the smaller harmonic.

9. The apparatus of claim 8 wherein the medium is a three phase 60 hertz electric power system with the harmonics being multiples of the power system frequency and said larger bounding harmonic is an odd one which is a multiple of 180 hertz.

10. A method for communicating digital data through a medium polluted with harmonic signals by passing a modulated carrier signal therethrough having a characteristic which is varied in a predetermined manner during each baud period representative of the data, comprising:
    generating a carrier signal whose frequency is asymmetrically positioned between two of the adjacent harmonics;
    modulating the carrier signal with digital data at a predetermined baud rate;
    applying the modulated carrier signal to the medium at some point;
    receiving the modulated carrier signal from the medium at another point;
    synchronously detecting the carrier signal by converting the varying characteristic thereof to a DC signal, and
    integrating the DC signal during each baud period for a time interval that places the spectral density nulls of said synchronous detection response in the frequency domain at said two adjacent harmonics.

11. The method of claim 10 wherein one of the adjacent harmonics bounding the carrier signal frequency is greater in magnitude than the other and the frequency separation between the carrier signal frequency and the larger harmonic is greater than that between the carrier signal frequency and the smaller harmonic.

12. The method of claim 11 wherein the medium is a three phase 60 hertz electric power system with the harmonics being multiples of the power system frequency and said larger bounding harmonic is an odd one which is a multiple of 180 hertz.

* * * * *